(12) United States Patent
Imai et al.

(10) Patent No.: US 11,852,359 B2
(45) Date of Patent: Dec. 26, 2023

(54) AIR BLOWING APPARATUS AND AIR CONDITIONER

(71) Applicant: DAIKIN INDUSTRIES, LTD., Osaka (JP)

(72) Inventors: Yousuke Imai, Osaka (JP); Keita Kawahara, Osaka (JP); Aya Okuno, Osaka (JP); Masahiko Chouji, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 757 days.

(21) Appl. No.: 16/999,670

(22) Filed: Aug. 21, 2020

(65) Prior Publication Data
US 2020/0378625 A1    Dec. 3, 2020

Related U.S. Application Data

(63) Continuation of application No. PCT/JP2019/006729, filed on Feb. 22, 2019.

(30) Foreign Application Priority Data

Feb. 23, 2018    (JP) .................................. 2018-030601

(51) Int. Cl.
*G06T 15/00*    (2011.01)
*F24F 1/0029*    (2019.01)
(Continued)

(52) U.S. Cl.
CPC ............ *F24F 1/0029* (2013.01); *F04D 25/16* (2013.01); *F04D 29/56* (2013.01); *F04D 29/58* (2013.01);
(Continued)

(58) Field of Classification Search
CPC .......... F24F 11/74; F24F 1/0029; F24F 13/08; F24F 7/007; F05D 2210/12; Y02B 30/70;
(Continued)

(56) References Cited

U.S. PATENT DOCUMENTS 9,791,161 B2 * 10/2017 Fujishiro .................. F24F 3/163
10,197,302 B2 * 2/2019 Suzuki ..................... F24F 3/163
(Continued)

FOREIGN PATENT DOCUMENTS

CN    102486179 A    6/2012
CN    206738203 U    12/2017
(Continued)

OTHER PUBLICATIONS

Yu W, Zhang J, Li H. Numerical Simulation and Analysis of Thermal Environment in Air-Conditioning Office Building. InIOP Conference Series: Earth and Environmental Science Dec. 1, 2018 (vol. 199, No. 3, p. 032068). IOP Publishing.*
(Continued)

*Primary Examiner* — Phu K Nguyen
(74) *Attorney, Agent, or Firm* — Birch, Stewart, Kolasch & Birch, LLP

(57) ABSTRACT

An air-blowing apparatus includes a main body and a fan. In the main body a blow-out region is formed. The fan is provided in the main body and sends air toward the blow-out region. The air-blowing apparatus blows out air from the blow-out region such that a ratio (Vmax/Vmin) of a maximum value Vmax of wind velocity to a minimum value Vmin of the wind velocity is 1 or more and 10 or less in a target virtual plane. The target virtual plane is a virtual plane that faces the blow-out region. As a result, comfort of a person exposed to the wind sent from the air-blowing apparatus is improved.

8 Claims, 7 Drawing Sheets

(51) Int. Cl.
   *F24F 11/74*    (2018.01)
   *F04D 25/16*    (2006.01)
   *F04D 29/56*    (2006.01)
   *F04D 29/58*    (2006.01)
   *F24F 13/08*    (2006.01)

(52) U.S. Cl.
   CPC .............. *F24F 11/74* (2018.01); *F24F 13/08* (2013.01); *F05D 2210/12* (2013.01)

(58) Field of Classification Search
   CPC ...... F04D 29/541; F04D 25/16; F04D 29/703; F04D 29/58; F04D 27/004; F04D 29/56; F04D 29/545; F04D 25/166; F04D 25/08; F04D 29/441
   USPC .......................................................... 345/418
   See application file for complete search history.

(56) References Cited

U.S. PATENT DOCUMENTS

2015/0059298 A1    3/2015   Suzuki et al.
2020/0378625 A1*   12/2020  Imai .................. F24F 11/74

FOREIGN PATENT DOCUMENTS

| JP | 6-94291 A | 4/1994 |
|---|---|---|
| JP | 2006-519972 A | 8/2006 |
| JP | 2008-536040 A | 9/2008 |
| JP | 2011-89444 A | 5/2011 |
| JP | 2013-53835 A | 3/2013 |
| JP | 2018-89734 A | 5/2016 |
| JP | 2016-169890 A | 9/2016 |
| JP | 2017-115629 A | 6/2017 |
| WO | WO 2004/085928 A2 | 10/2004 |
| WO | WO 2011/056319 A2 | 5/2011 |

OTHER PUBLICATIONS

The English translation of JP 2013053835, Mar. 2013.*
The English translation of JP 2016169890, Sep. 2016.*
Li H, Liu H, Zhu H, Goh H, Zhang D, Wu T. Research on the coordinated control of large permanent magnet direct drive fan and air conditioner based on finite element method. Energy Reports. Sep. 1, 2023;9:1334-45.*
Extended European Search Report for European Application No. 19757862.8, dated Sep. 21, 2021.

* cited by examiner

US 11,852,359 B2

AIR BLOWING APPARATUS AND AIR CONDITIONER

CROSS REFERENCE TO RELATED APPLICATIONS

This application is a Continuation of PCT International Application No. PCT/JP2019/006729, filed on Feb. 22, 2019, and which claims priority under 35 U.S.C. 119(a) to Patent Application No. 2018-030601, filed in the Japanese Patent Office on Feb. 23, 2018, all of which are hereby expressly incorporated by reference into the present application.

TECHNICAL FIELD

The present disclosure relates to an air-blowing apparatus and an air conditioner including the air-blowing apparatus.

BACKGROUND ART

Patent Document 1 discloses an air-blowing apparatus including a plurality of axial blowers. The air-blowing apparatus utilizes an inducing action by an air current blown out from the blowers to obtain a relatively large air-blowing volume.

CITATION LIST

Patent Document

Patent Document 1: Japanese Unexamined Patent Publication No. 2016-089734

SUMMARY

A first aspect of the present disclosure is directed to an air-blowing apparatus including: a main body (15) in which a blow-out region (16) for blowing out air is formed; and a blowing member (30) provided in the main body (15) and configured to send the air toward the blow-out region (16), wherein in a case in which a rectangular virtual plane that faces the blow-out region (16), is positioned at a distance of 1 m from the blow-out region (16), and has a long side extending in a vertical direction and having a length of 60 cm and a short side extending in a right-to-left direction and having a length of 45 cm is set as a front virtual plane (65), a rectangular virtual plane that faces the blow-out region (16), is positioned at a distance of 3 m from the blow-out region (16), and has a long side extending in the vertical direction and having a length of 180 cm and a short side extending in the right-to-left direction and having a length of 90 cm is set as a rear virtual plane (67), a virtual space having a shape of a truncated square pyramid and including the front virtual plane (65) and the rear virtual plane (67) as base planes is set as a target virtual space (60), and at least one of virtual planes included in the target virtual space (60) and parallel to the front virtual plane (65) is set as a target virtual plane (61), air is blown out from the blow-out region (16) such that a ratio (Vmax/Vmin) of a maximum value Vmax of wind velocity to a minimum value Vmin of the wind velocity is 1 or more and 10 or less in the target virtual plane (61).

DESCRIPTION OF EMBODIMENTS

First Embodiment

Hereinafter, an air-blowing apparatus (10) of a first embodiment will be described with reference to FIGS. 1 to 4, as necessary.

—Configuration of Air-blowing Apparatus—

<Main Body>

Figure 1:
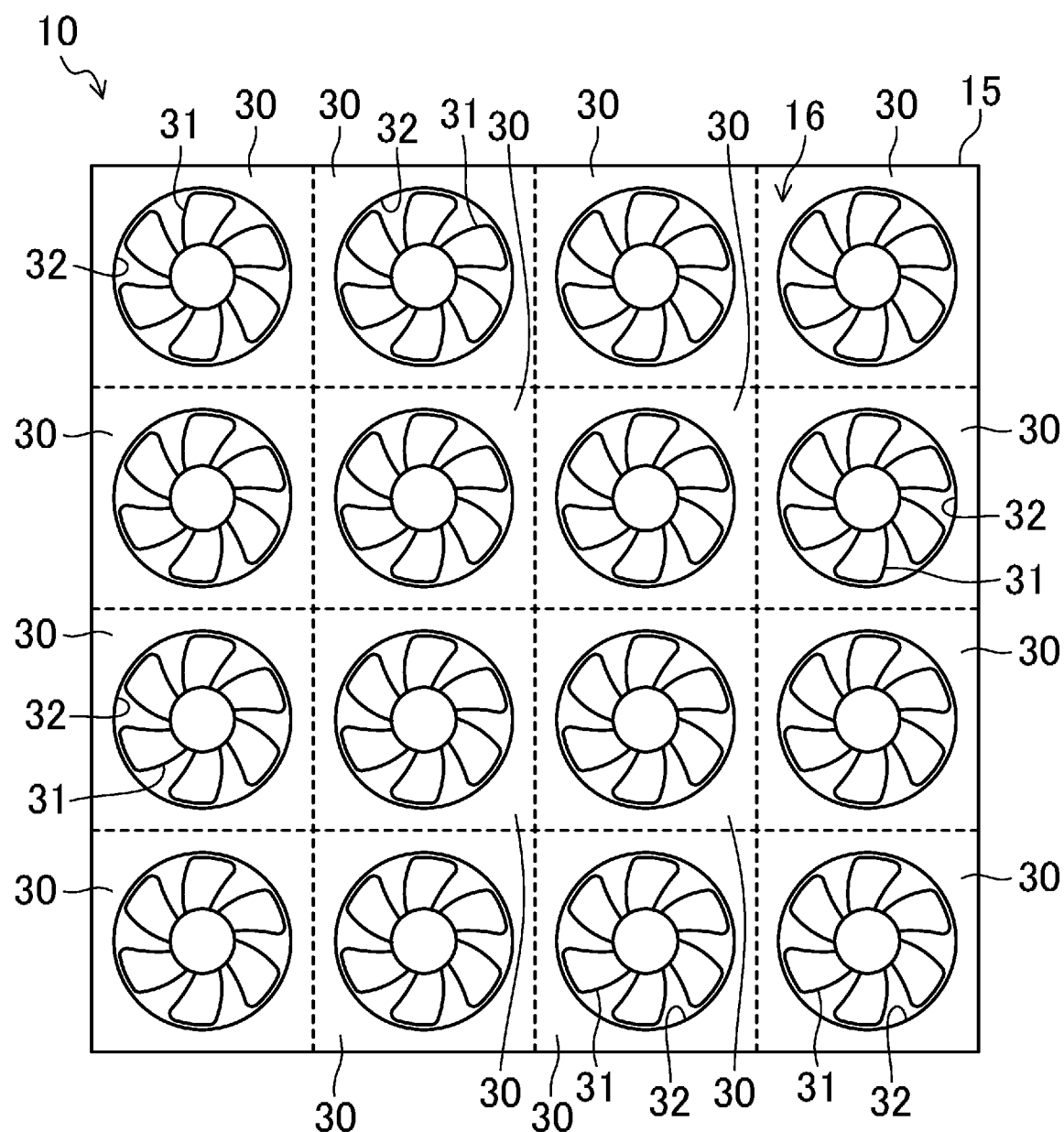
FIG. 1 is a schematic front view of a main body of an air-blowing apparatus of a first embodiment.
Figure 2:
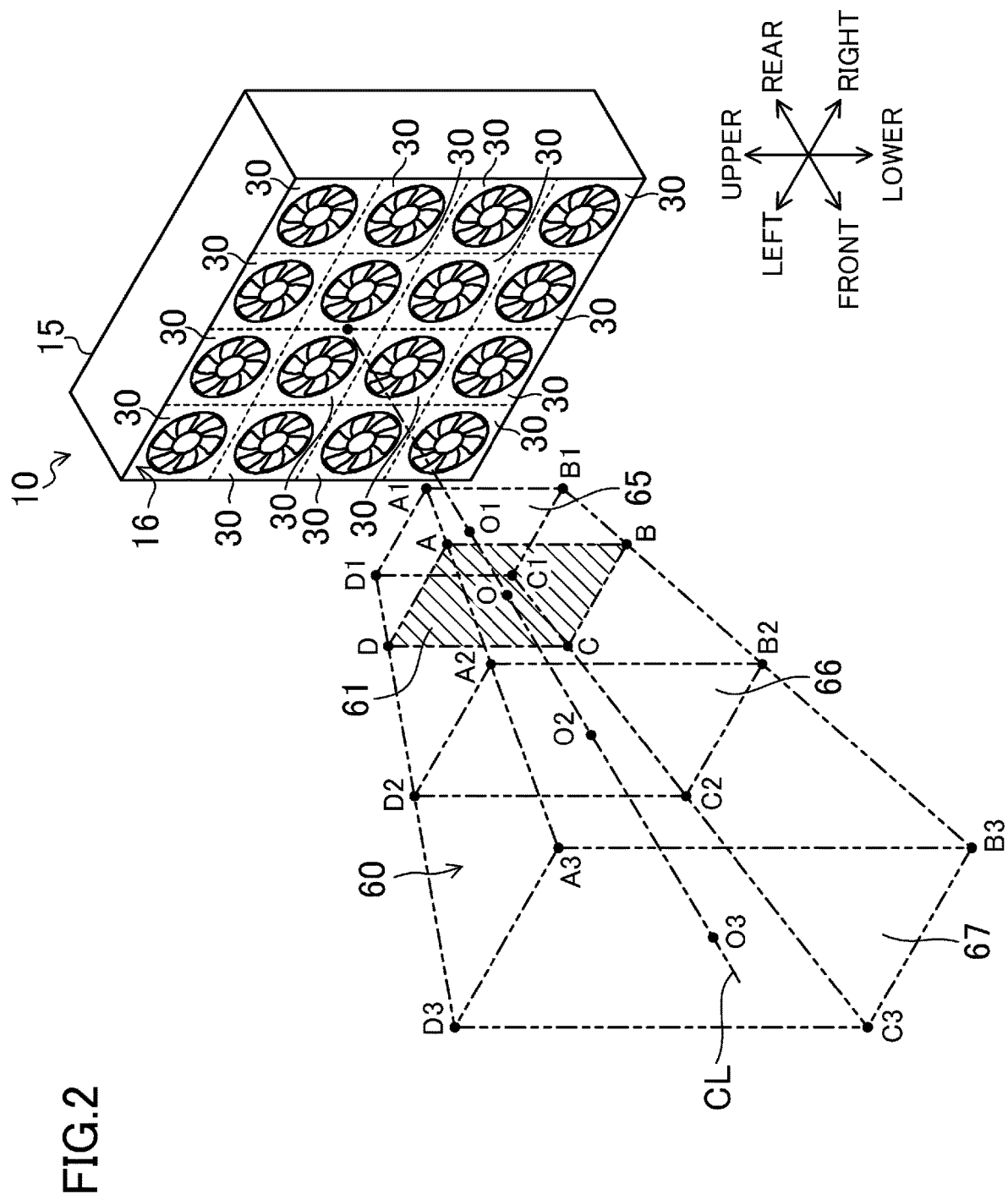
FIG. 2 is a schematic perspective view illustrating the main body of the air-blowing apparatus of the first embodiment and a target virtual space.

As shown in FIGS. 1 and 2, the air-blowing apparatus (10) includes a main body (15). The main body (15) is formed in a rectangular parallelepiped shape having a relatively short depth in a front-rear direction. The main body (15) has a width in a right-to-left direction and a height in a vertical direction, each of approximately 1.6 m. Note that "upper", "lower", "left", "right", "front", and "rear" used in the description of the main body (15) refer to the directions shown in FIG. 2 (i.e., the directions when the main body (15) is viewed from the front).

The main body (15) is provided with sixteen fans (30) as blowing members. In the main body (15), the sixteen fans (30) are arranged in matrix, four in the right-to-left direction and four in a vertical direction. Each fan (30) is an axial blower including an impeller (31) and a shroud (32). The impeller (31) is a so-called propeller fan. The shroud (32) is arranged in each fan (30) to surround the circumference of the impeller (31). Although not shown, each fan (30) is provided with a fan motor for driving the impeller (31). The impeller (31) is attached to an output shaft of the fan motor.

In the main body (15), the sixteen fans (30) face onto the front surface of the main body (15). The front surface of the main body (15) constitutes a blow-out region (16) from which the air that has been blown out from each fan (30) is blown out. In the air-blowing apparatus (10) of the present embodiment, the blow-out region (16) is a square plane having a width of 1.6 m in the right-to-left direction and a height of 1.6 m in the vertical direction.

<Controller>

Figure 4:
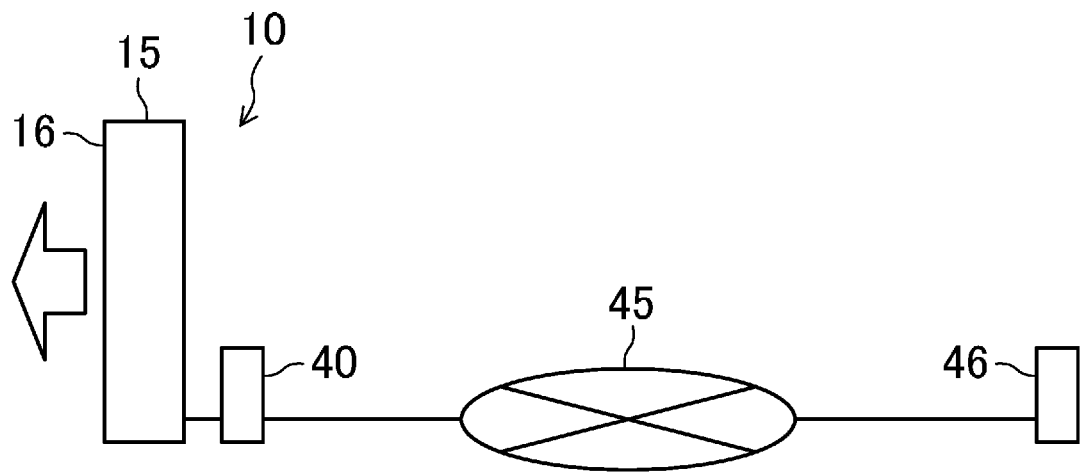
FIG. 4 is a schematic configuration diagram illustrating a state of use of the air-blowing apparatus of the first embodiment.

As shown in FIG. 4, the air-blowing apparatus (10) further includes a controller (40). Although not shown, the controller (40) includes a CPU that executes a control program, and a memory that stores the control program, data necessary for executing the control program, and the like.

The controller (40) is communicably connected to a sensor unit (46) installed outdoors at a remote location via a communication line (45) such as the Internet. Although not shown, the sensor unit (46) includes a single wind velocity sensor that measures velocity of wind (natural wind) blowing in the outdoor natural environment where the wind velocity sensor is installed. The sensor unit (46) transmits the measured value of the wind velocity sensor to the controller (40) via the communication line (45) in real time. The data sent from the sensor unit (46) to the controller (40) is wind velocity data including a record of a fluctuation pattern of natural wind at the installation location.

The controller (40) is configured to control rotational speed of the impellers (31) of the fans (30) provided in the main body (15) based on the wind velocity data received from the sensor unit (46). At that time, the controller (40) sets the rotational speed of the impellers (31) of all the fans (30) to the same value.

—Operation of Air-Blowing Apparatus—

In the air-blowing apparatus (10) of the present embodiment, the impeller (31) of each fan (30) rotates at the same rotational speed. Therefore, each of the sixteen fans (30) arranged in matrix in the main body (15) blows out wind having substantially equal velocity. The air blown out by the sixteen fans (30) is blown forward from the blow-out region (16) which is the front surface of the main body (15).

Streams of air which were blown out from each fan (30) and passed through the blow-out region (16) diffuse into each other. Thus, wind velocity of each stream is averaged. As a result, a ratio Vmax/Vmin of a maximum value Vmax to a minimum value Vmin of wind velocity is 1 or more and 10 or less (1≤Vmax/Vmin≤10) in each portion of the target virtual plane (61) shown in FIG. 2. Note that the ratio Vmax/Vmin of the maximum value Vmax to the minimum value Vmin of wind velocity in each portion of the target virtual plane (61) is preferably 1 or more and 5 or less, more preferably 1 or more and 4 or less, further preferably 1 or more and 3 or less, still preferably 1 or more and 2.5 or less, and particularly preferably 1 or more and 2 or less.

—Operation of Controller—

The controller (40) adjusts the rotational speed of the impeller (31) of each fan (30) such that a fluctuation pattern of flow rate of the air blown out from the blow-out region (16) is a fluctuation pattern of wind velocity included in the wind velocity data received from the sensor unit (46). That is, when the measured value of wind velocity included in the wind velocity data increases, the controller (40) boosts the rotational speed of the impeller (31) of each fan (30), and when the measured value of wind velocity included in the wind velocity data decreases, the controller (40) reduces the rotational speed of the impeller (31) of each fan (30). As a result, the fluctuation pattern of natural wind at the installation location of the sensor unit (46) is reproduced in the target virtual plane (61) which faces the blow-out region (16).

—Vmax/Vmin in Target Virtual Plane—

As described above, the air-blowing apparatus (10) of the present embodiment sets the ratio Vmax/Vmin of the maximum value Vmax to the minimum value Vmin of wind velocity in each portion of the target virtual plane (61) to 1 or more and 10 or less. The reason for this will be now described.

Unlike wind which is blown out from a common air conditioner, wind (natural wind) blowing outdoors in a natural environment is characterized in that "wind velocity distribution is relatively small in a relatively large area." To confirm that, the designers of the air-blowing apparatus (10) of the present embodiment actually measured natural wind velocity.

The measured area was rectangular and had a width of 45 cm in a right-to-left direction and a height of 60 cm in a vertical direction. The designers measured natural wind velocity in each portion of the area. In the measured area, twenty wind velocity sensors were arranged in matrix. Specifically, in the measured area, four wind velocity sensors were arranged at intervals of 15 cm in the right-to-left direction and five wind velocity sensors were arranged at intervals of 15 cm in the vertical direction. Then, the designers recorded measured values of each of the wind velocity sensors every 0.5 second for 300 seconds, and calculated Vmax/Vmin of the measured area at each time. The results of measurement of wind velocity for 300 seconds were as follows: the minimum value of Vmax/Vmin was 1.2, and the maximum value of Vmax/Vmin was 4.6.

The results of the measurement have shown that a person who faces the air-blowing apparatus (10) and is exposed to the wind blown therefrom feels as if being exposed to natural wind when the Vmax/Vmin in the target virtual plane (61) is set to approximately 10 or less. Therefore, Vmax/Vmin in the target virtual plane (61) is set to 1 or more and 5 or less in the air-blowing apparatus (10) of the present embodiment, which allows the person exposed to the wind from the air-blowing apparatus (10) to feel as if being exposed to natural wind and provide high comfort to the person.

—Target Virtual Space and Target Virtual Plane—

Figure 3:
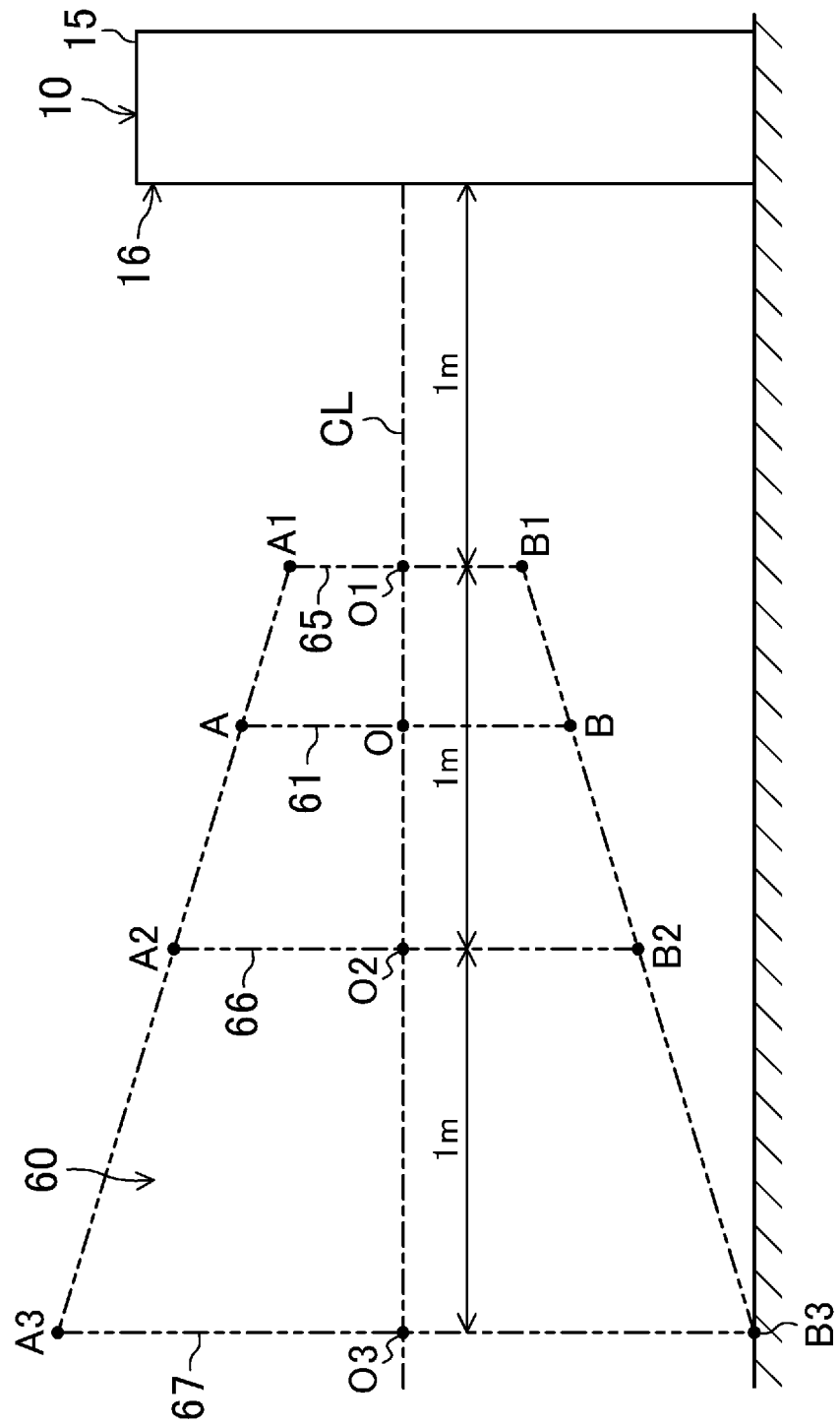
FIG. 3 is a schematic side view illustrating the main body of the air-blowing apparatus of the first embodiment and the target virtual space.

As shown in FIGS. 2 and 3, a target virtual space (60) is a virtual space having a truncated square pyramid shape and includes a first virtual plane (65) and a third virtual plane (67) as base planes. The target virtual space (60) includes a second virtual plane (66). A target virtual plane (61) is a virtual plane included in the target virtual space (60).

<First Virtual Plane>

The first virtual plane (65) is a front virtual plane. The first virtual plane (65) is a virtual plane indicated by the rectangle A1, B1, C1, D1 in FIG. 2.

Specifically, the first virtual plane (65) is a rectangular virtual plane facing the blow-out region (16). The first virtual plane (65) is a vertical plane parallel to the blow-out region (16). The distance from the first virtual plane (65) to the blow-out region (16) is 1 m. A long side of the first virtual plane (65) extends in the vertical direction. The long side of the first virtual plane (65) has a length of 60 cm. A short side of the first virtual plane (65) extends in the right-to-left direction. The short side of the first virtual plane (65) has a length of 45 cm.

A center of gravity O1 of the first virtual plane (65) is located on a center line (CL) of the target virtual space (60). The center line (CL) of the target virtual space (60) is a horizontal straight line perpendicular to the first virtual plane (65) and the blow-out region (16).

<Second Virtual Plane>

The second virtual plane (66) is a middle virtual plane. The second virtual plane (66) is a virtual plane indicated by the rectangle A2, B2, C2, D2 in FIG. 2. The second virtual plane (66) is located midway between the first virtual plane (65) and the third virtual plane (67).

Specifically, the second virtual plane (66) is a rectangular virtual plane facing the blow-out region (16). The second virtual plane (66) is a vertical plane parallel to the blow-out region (16). The distance from the second virtual plane (66) to the blow-out region (16) is 2 m. A long side of the second virtual plane (66) extends in the vertical direction. The long side of the second virtual plane (66) has a length of 120 cm. A short side of the second virtual plane (66) extends in the right-to-left direction. The short side of the second virtual plane (66) has a length of 67.5 cm.

A center of gravity O2 of the second virtual plane (66) is located on the center line (CL) of the target virtual space (60). The second virtual plane (66) is perpendicular to the center line (CL) of the target virtual space (60).

<Third Virtual Plane>

The third virtual plane (67) is a rear virtual plane. The third virtual plane (67) is a virtual plane indicated by the rectangle A3, B3, C3, D3 in FIG. 2.

Specifically, the third virtual plane (67) is a rectangular virtual plane facing the blow-out region (16). The third virtual plane (67) is a vertical plane parallel to the blow-out region (16). The distance from the third virtual plane (67) to the blow-out region (16) is 3 m. A long side of the third virtual plane (67) extends in the vertical direction. The long side of the third virtual plane (67) has a length of 180 cm. A short side of the third virtual plane (67) extends in the right-to-left direction. The short side of the third virtual plane (67) has a length of 90 cm.

A center of gravity O3 of the third virtual plane (67) is located on the center line (CL) of the target virtual space (60). The third virtual plane (67) is perpendicular to the center line (CL) of the target virtual space (60).

<Target Virtual Plane>

The target virtual plane (61) of the present embodiment is a virtual plane indicated by the rectangle A, B, C, D in FIG. 2. The target virtual plane (61) is a virtual plane included in the target virtual space (60) and parallel to the first virtual plane (65).

Specifically, the target virtual plane (61) is a rectangular virtual plane facing the blow-out region (16). The target virtual plane (61) is a vertical plane parallel to the blow-out region (16). In the target virtual space (60), the target virtual plane (61) of the present embodiment is located between the first virtual plane (65) and the second virtual plane (66). A long side of the target virtual plane (61) extends in the vertical direction. A short side of the target virtual plane (61) extends in the right-to-left direction.

A center of gravity O of the target virtual plane (61) is located on the center line (CL) of the target virtual space (60). The target virtual plane (61) is perpendicular to the center line (CL) of the target virtual space (60).

—Characteristics (1) of First Embodiment—

The air-blowing apparatus (10) of the present embodiment includes the main body (15) in which the planar blow-out region (16) for blowing air is formed, and the fans (30) provided in the main body (15) and configured to send the air toward the blow-out region (16). In addition, the air-blowing apparatus (10) blows the air from the blow-out region (16) such that the ratio (Vmax/Vmin) of the maximum value Vmax of wind velocity to the minimum value Vmin of the wind velocity is 1 or more and 10 or less in the target virtual plane (61).

The target virtual plane (61) is at least one of the virtual planes included in the target virtual space (60) and parallel to the first virtual plane (65). The target virtual space (60) is a virtual space having a truncated square pyramid shape. The target virtual space (60) includes a first virtual plane (65) and a third virtual plane (67) as base planes. The first virtual plane (65) is a rectangular virtual plane which faces the blow-out region (16) and is positioned at a distance of 1 m from the blow-out region (16). The long side of the first virtual plane (65) extends in the vertical direction and has a length of 60 cm. The short side of the first virtual plane (65) extends in the right-to-left direction and has a length of 45 cm. The third virtual plane (67) is a rectangular virtual plane which faces the blow-out region (16) and is positioned at a distance of 3 m from the blow-out region (16). The long side of the third virtual plane (67) extends in the vertical direction and has a length of 180 cm. The short side of the third virtual plane (67) extends in the right-to-left direction and has a length of 90 cm.

In the present embodiment, the airflow generated by the blowing members (30) is sent out from the blow-out region (16) toward the target virtual plane (61). The ratio (Vmax/Vmin) of the maximum value Vmax to the minimum value Vmin of wind velocity is 1 or more and 10 or less in each portion of the target virtual plane (61). For this reason, wind blown out from the blow-out region (16) has a relatively small difference in velocity when blowing against different parts of the body of a person exposed to the wind. Consequently, the present embodiment may provide a person with comfort similar to that when the person is exposed to natural wind, and may improve comfort of the person exposed to the wind from the air-blowing apparatus (10).

—Characteristics (2) of First Embodiment—

The target virtual plane (61) of the present embodiment is located in a portion of the target virtual space (60) between the first virtual plane (65) and the second virtual plane (66). The second virtual plane (66) is a rectangular virtual plane which faces the blow-out region (16) and is positioned at a distance of 2 m from the blow-out region (16). The long side of the second virtual plane (66) extends in the vertical direction and has a length of 120 cm. The short side of the second virtual plane (66) extends in the right-to-left direction and has a length of 67.5 cm.

—Characteristics (3) of First Embodiment—

In the air-blowing apparatus (10) of the present embodiment, the plurality of fans (30) constituting the blowing members are arranged so as to face onto the blow-out region (16). When the fans (30) are operating, air is blown out from the blow-out region (16) of the main body (15).

—Characteristics (4) of First Embodiment—

In the air-blowing apparatus (10) of the present embodiment, the controller (40) controls operation of the fans (30), based on the wind velocity data including a fluctuation pattern of a wind velocity of outdoor natural wind obtained in real time, such that the fluctuation pattern of the flow rate of the air blown from the blow-out region (16) is the fluctuation pattern of the wind velocity included in the wind velocity data. Consequently, according to the present embodiment, the air-blowing apparatus (10) may reproduce the fluctuation pattern of natural wind velocity included in the wind velocity data.

—Variation of First Embodiment—

The sensor unit (46) may be provided with a plurality of wind velocity sensors.

For example, in a case in which four of the wind velocity sensors are provided in the sensor unit (46), the wind velocity sensors are desirably arranged in matrix, two in the right-to-left direction and two in the vertical direction. In this case, in the main body (15), the four fans (30) located on the upper side on the right are associated with the first wind velocity sensor; the four fans (30) located on the lower side on the right are associated with the second wind velocity sensor; the four fans (30) located on the lower side on the left are associated with the third wind velocity sensor; and the four fans (30) located on the upper side on the left are associated with the fourth wind velocity sensor. The controller (40) adjusts the rotational speed of the impeller

(31) of each fan (30) depending on the measured values of the corresponding wind velocity sensors.

Further, for example, in a case in which sixteen wind velocity sensors are provided in the sensor unit (46), each of the sixteen fans (30) provided in the main body (15) is associated with a different wind velocity sensor. In this case, the controller (40) individually adjusts the rotational speed of the impeller (31) of each of the fans (30) depending on the measured value of the wind velocity sensor corresponding to each fan (30).

Second Embodiment

Figure 5:
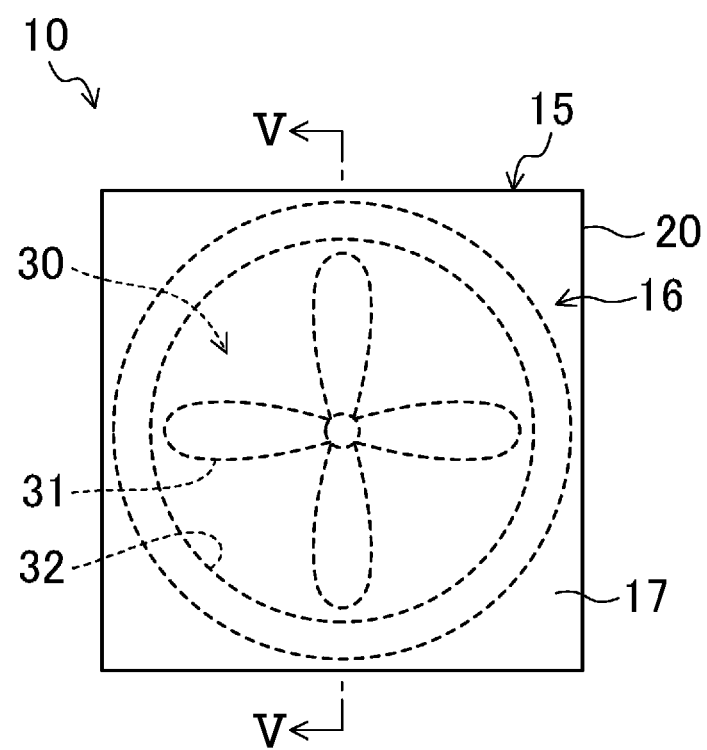
FIG. 5 is a schematic front view of a main body of an air-blowing apparatus of a second embodiment.
Figure 6:
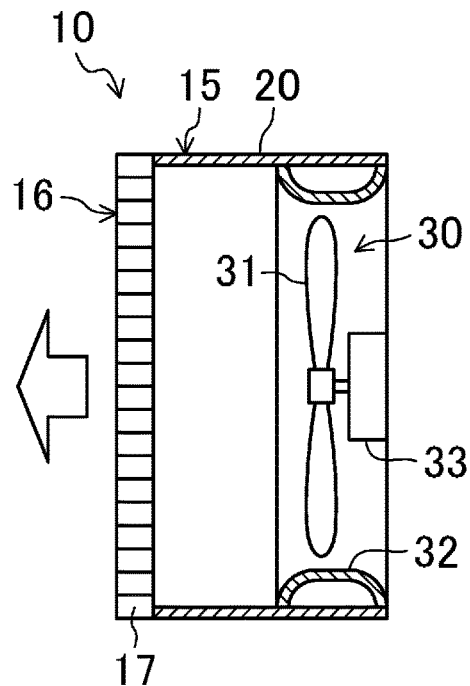
FIG. 6 is a schematic cross-sectional view illustrating the main body of the air-blowing apparatus of the second embodiment taken along the line V-V of FIG. 5.

A second embodiment will be now described. An air-blowing apparatus (10) of the present embodiment is a modified version of the air-blowing apparatus (10) of the first embodiment, in which the configuration of the main body (15) has been modified. Here, the main body (15) of the present embodiment will be described with reference to FIGS. 5 and 6.

The main body (15) of the present embodiment includes one casing (20), one fan (30), and one rectifying member (17). The main body (15) is formed in a rectangular parallelepiped shape having a relatively short depth in a front-rear direction.

The casing (20) is formed in a square frame shape (or a short rectangular duct shape) when viewed from the front. The casing (20) has a width in the right-to-left direction and a height in the vertical direction, each of approximately 1.6 m.

The fan (30) is housed in the casing (20), and arranged closer to the rear end of the casing (20). The fan (30) of the present embodiment is an axial blower similar to the fans (30) of the first embodiment. The fan (30) includes one impeller (31), one fan motor (33), and one shroud (32).

The rectifying member (17) is a member configured to allow air to pass therethrough and to adjust flow of air passing therethrough. The rectifying member (17) is formed of, for example, a plurality of stacked non-woven fabric sheets, a punching plate in which multiple small holes are formed, or the like. The rectifying member (17) of the present embodiment is formed in a thick square plate-like shape, and is arranged so as to cover an entire opening end on a front surface side of the casing (20). In the main body (15) of the present embodiment, the front surface of the rectifying member (17) serves as a blow-out region (16). Consequently, in the air-blowing apparatus (10) of the present embodiment, as well, the blow-out region (16) is a square plane having a width of 1.6 m in the right-to-left direction and a height of 1.6 m in the vertical direction.

In the air-blowing apparatus (10) of the present embodiment, the controller (40) performs a control of the single fan (30) provided in the main body (15). That is, the controller (40) adjusts the rotational speed of the impeller (31) of the fan (30) based on the data on air blow received from the sensor unit (46).

In the air-blowing apparatus (10) of the present embodiment, the flow of the air blown from the fan (30) is adjusted when the air passes through the rectifying member (17). Then, in the blow-out region (16) which is the front surface of the rectifying member (17), the flow rate of the air passing through each portion of the blow-out region (16) is averaged. As a result, the ratio Vmax/Vmin of the maximum value Vmax to the minimum value Vmin of wind velocity is 1 or more and 5 or less (1≤Vmax/Vmin≤5) in each portion of the target virtual plane (61) which faces the blow-out region (16). Note that a shape and size of the target virtual plane (61), and the distance from the target virtual plane (61) to the blow-out region (16) are the same as those of the first embodiment.

As described above, in the air-blowing apparatus (10) of the present embodiment, the main body (15) includes the rectifying member (17) configured to allow air to pass therethrough and provided on the entire blow-out region (16). In addition, the fan (30) which is the blowing member is arranged upstream of the rectifying member (17) in the main body (15). In the air-blowing apparatus (10) of the present embodiment, air blown out from the fan (30) is rectified when passing through the rectifying member (17), and then blown out from the blow-out region (16).

—First Variation of Second Embodiment—

Figure 7:
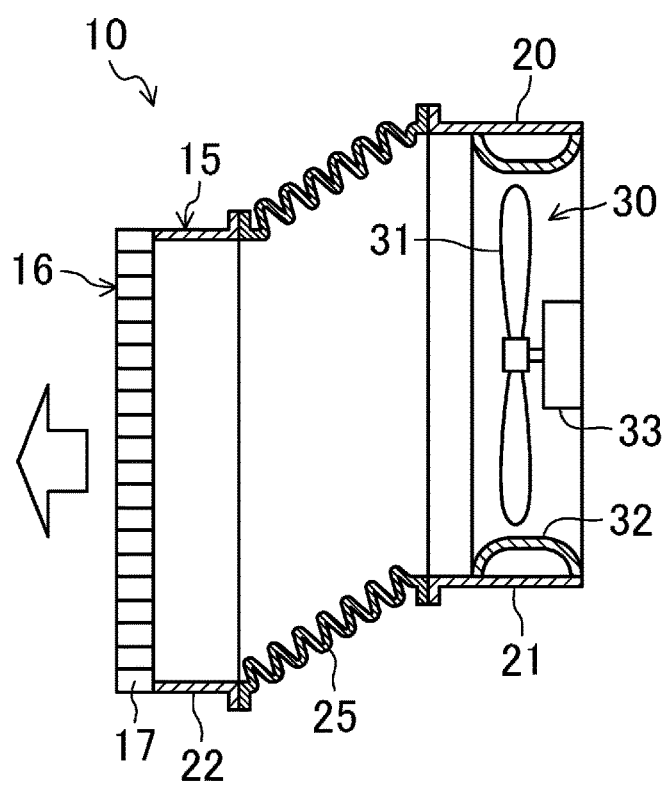
FIG. 7 is a schematic cross-sectional view illustrating a cross section of a main body of an air-blowing apparatus of a first variation of the second embodiment, and corresponds to FIG. 6.

As shown in FIG. 7, in the air-blowing apparatus (10) of the present embodiment, the casing (20) of the main body (15) may be divided into a suction side casing (21) and a blow-out side casing (22). The single fan (30) is housed in the suction side casing (21). The rectifying member (17) is attached to the blow-out side casing (22) so as to cover the front surface thereof. The suction side casing (21) and the blow-out side casing (22) are connected by a bellows-shaped connecting duct (25).

—Second Variation of Second Embodiment—

Figure 8:
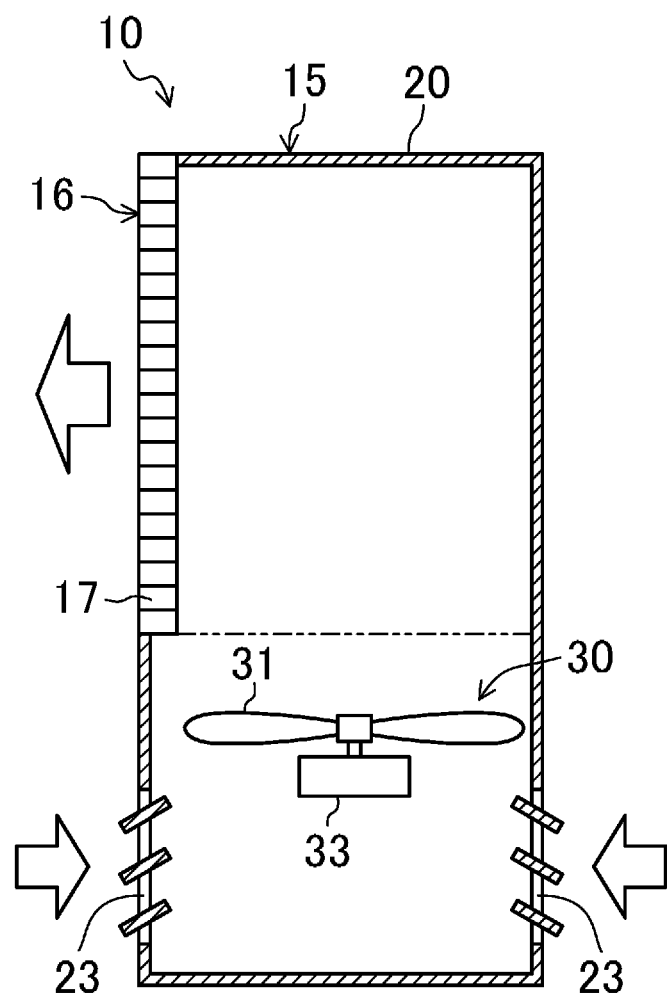
FIG. 8 is a schematic cross-sectional view illustrating a cross section of a main body of an air-blowing apparatus of a second variation of the second embodiment, and corresponds to FIG. 6.

As shown in FIG. 8, the air-blowing apparatus (10) of the present embodiment may be arranged such that the fan (30) blows air upward.

The casing (20) of the present variation is formed in a box-like rectangular parallelepiped shape. The casing (20) has an upper portion of the front surface open, and the rectifying member (17) is attached so as to cover the opening. The casing (20) has a front side plate and a rear side plate. The front side plate and the rear side plate each have an inlet (23) formed near a lower end. The fan (30) is arranged above the inlet (23) and below the rectifying member (17) in an internal space of the casing (20). Further, the fan (30) is installed in the casing (20) such that a rotation axis of the impeller (31) is directed vertically. Note that the shroud of the fan (30) is not shown in FIG. 8.

When the fan (30) is operating, air flows through the inlets (23) and into the internal space of the casing (20). The air that has flowed into the internal space of the casing (20) is blown upward by the fan (30), and turned forward. Then, the air passes through the rectifying member (17) and is blown out from the casing (20).

—Third Variation of Second Embodiment—

The air-blowing apparatus (10) of the present embodiment and the first and second variations thereof may be provided with a plurality of fans (30). For example, four fans (30) may be arranged in the casing (20) in matrix in the air-blowing apparatus (10) of the present embodiment and the first and second variations thereof.

Third Embodiment

A third embodiment will be now described. The present embodiment is directed to an air conditioner (50) provided with the air-blowing apparatus (10) of the first embodiment.

Figure 9:
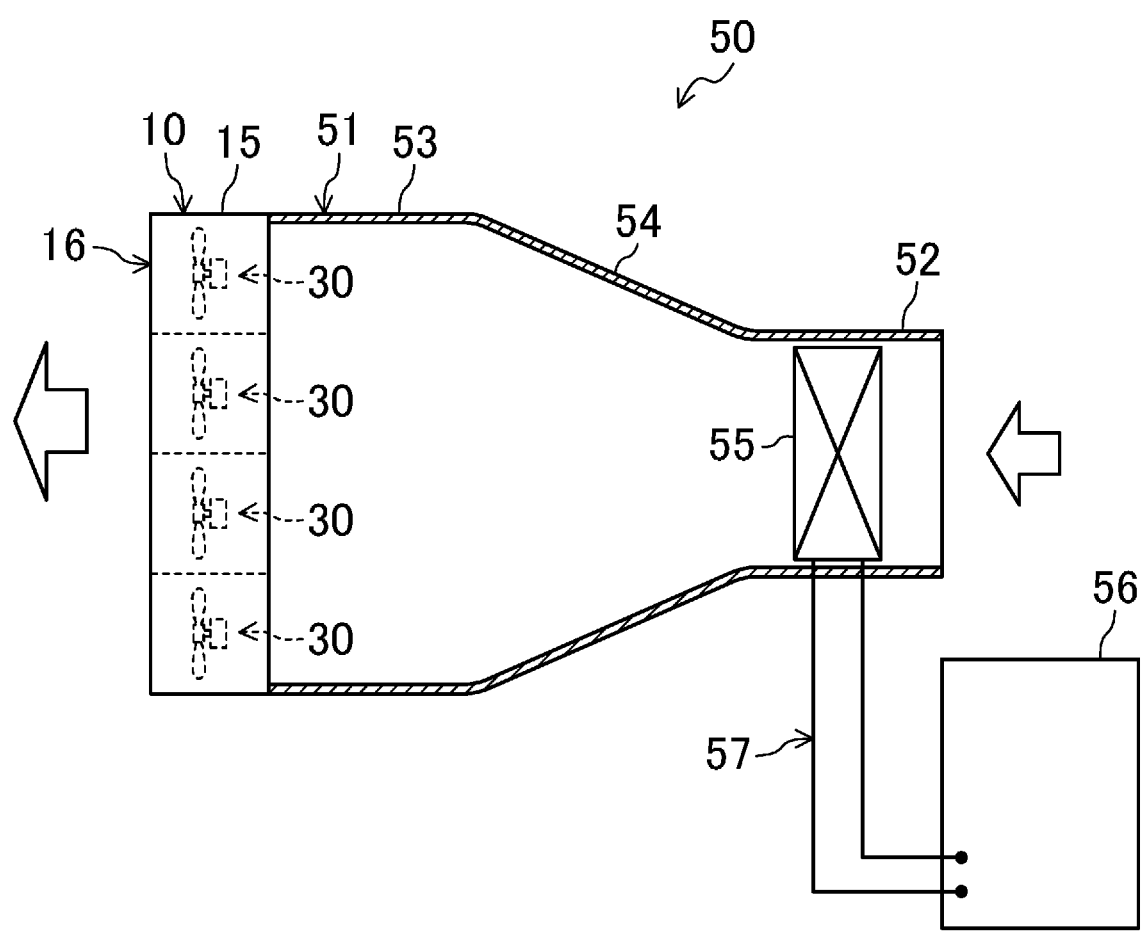
FIG. 9 is a cross-sectional view illustrating a general configuration of an air conditioner of a third embodiment.

As shown in FIG. 9, the air conditioner (50) of the present embodiment includes the air-blowing apparatus (10) of the first embodiment, a duct member (51), a heat exchanger (55), and an outdoor unit (56).

The duct member (51) includes a blow-out end portion (53), a suction end portion (52), and an expanding portion (54). The blow-out end portion (53) is formed in a rectangular duct shape in size corresponding to the air-blowing apparatus (10). The suction end portion (52) is formed in a rectangular duct shape and has a smaller area of a flow path in a cross section than the blow-out end portion (53). The expanding portion (54) is formed in a shape in which the cross-sectional area of the flow path gradually increases from the suction end portion (52) toward the blow-out end portion (53). The expanding portion (54) connects the suction end portion (52) and the blow-out end portion (53).

The main body (15) of the air-blowing apparatus (10) is arranged so as to cover a terminal end of the blow-out end portion (53) (left end in FIG. 9). The heat exchanger (55) is housed in the suction end portion (52). The heat exchanger (55) is an air heat exchanger that exchanges heat between refrigerant and air. The outdoor unit (56) is connected to the heat exchanger (55) via a pipe, and constitutes a refrigerant circuit (57) that performs a refrigeration cycle. Although not illustrated, the outdoor unit (56) houses devices such as a compressor, an outdoor fan, an outdoor heat exchanger, and the like.

When the fan (30) of the air-blowing apparatus (10) is operating, air is sucked into the suction end (52) of the duct member (51). The air that has been sucked into the duct member (51) flows in the duct member (51) as supply air. The air is then cooled or heated by exchanging heat with the refrigerant while passing through the heat exchanger (55). The supply air has its temperature adjusted while passing through the heat exchanger (55), and then is blown into an indoor space by the air-blowing apparatus (10).

As described above, the air conditioner (50) of the present embodiment includes the air-blowing apparatus (10) of the first embodiment and the heat exchanger (55) that allows heat exchange of supply air to be sucked into the air-blowing apparatus (10) with a thermal medium to adjust the temperature of the supply air.

The air conditioner (50) of the present embodiment blows out, by the air-blowing apparatus (10), the supply air which had its temperature adjusted while passing through the heat exchanger (55) Therefore, according to the air conditioner (50) of the present embodiment, both the flow rate and the temperature of the air blown out from the air-blowing apparatus (10) may be adjusted.

—Variation of Third Embodiment—

Instead of the air-blowing apparatus (10) of the first embodiment, the air conditioner (50) of the present embodiment may be provided with the air-blowing apparatus (10) of the variation of the first embodiment, or may be provided with the air-blowing apparatus (10) of the second embodiment or first and second variations thereof.

Other Embodiments

In the air-blowing apparatus (10) of each of the foregoing embodiments and variations thereof, the controller (40) may be configured to read the wind velocity data recorded on a recording medium, such as a memory card, and control the fans (30) of the main body (15), based on the read wind velocity data.

The air-blowing apparatus (10) of each of the foregoing embodiments and variations thereof may be configured to blow out the air from the blow-out region (16) such that the ratio (Vmax/Vmin) of the maximum value Vmax of wind velocity to the minimum value Vmin of the wind velocity is 1 or more and 5 or less in the target virtual plane (61).

In addition, the air-blowing apparatus (10) of each of the foregoing embodiments and variations thereof may be configured to blow out air from the blow-out region (16) such that the ratio (Vmax/Vmin) of the maximum value Vmax of wind velocity to the minimum value Vmin of the wind velocity is 1 or more and 2.5 or less in the target virtual plane (61).

Further, the air-blowing apparatus (10) of each of the foregoing embodiments and variations thereof may be configured to blow out air from the blow-out region (16) such that the ratio (Vmax/Vmin) of the maximum value Vmax to the minimum value Vmin of wind velocity is a value within a predetermined value range in the third virtual plane (67) which is the target virtual plane (61).

Additionally, the air-blowing apparatus (10) of each of the foregoing embodiments and variations thereof may be configured to blow air from the blow-out region (16) such that the ratio (Vmax/Vmin) of the maximum value Vmax to the minimum value Vmin of wind velocity is a value within a predetermined value range in the plurality of target virtual planes (61).

In the air-blowing apparatus (10) of each of the foregoing embodiments and variations thereof, the type of the fan (30) is not limited to a propeller fan. For example, the fan (30) may be a mixed flow fan or a sirocco fan.

In the air-blowing apparatus (10) of each of the foregoing embodiments and variations thereof, a so-called ion wind element may be provided as the blowing member in the main body (15). The ion wind element is an element configured to generate plasma by a discharge and generate wind by the generated plasma.

While embodiments and variations have been described above, it will be understood that various modifications in form and detail may be made without departing from the spirit and scope of the present disclosure as set forth in the appended claims. The foregoing embodiments and variations may be appropriately combined or replaced unless the function of the target of the present disclosure is impaired.

INDUSTRIAL APPLICABILITY

As described above, the present disclosure is useful for an air-blowing apparatus and an air conditioner including the air-blowing apparatus.

DESCRIPTION OF REFERENCE CHARACTERS

15 Main Body
16 Blow-out Region
17 Rectifying Member
30 Fan (Blowing Member)
40 Controller
50 Air Conditioner
55 Heat Exchanger
60 Target Virtual Space
61 Target Virtual Plane
65 First Virtual Plane (Front Virtual Plane)
66 Second Virtual Plane (Middle Virtual Plane)
67 Third Virtual Plane (Rear Virtual Plane)

The invention claimed is:

1. An air-blowing apparatus comprising: a main body in which a blow-out region for blowing out air is formed; and a blowing member provided in the main body and configured to send the air toward the blow-out region, wherein
in a case in which
a rectangular virtual plane that faces the blow-out region, is positioned at a distance of 1 m from the blow-out region, and has a long side extending in a vertical direction and having a length of 60 cm and a short side extending in a right-to-left direction and having a length of 45 cm is set as a front virtual plane, a rectangular virtual plane that faces the blow-out region, is positioned at a distance of 3 m from the blow-out region, and has a long side extending in the vertical direction and having a length of 180 cm and a short side extending in the right-to-left direction and having a length of 90 cm is set as a rear virtual plane, a virtual space having a shape of a truncated square pyramid and including the front virtual plane and the rear virtual plane as base planes is set as a target virtual space, and at least one of virtual planes included in the target virtual space and parallel to the front virtual plane is set as a target virtual plane, air is blown out from the blow-out region such that a ratio (Vmax/Vmin) of a maximum value Vmax of wind velocity to a minimum value Vmin of the wind velocity is 1 or more and 10 or less in the target virtual plane, and the apparatus further comprises a controller which controls operation of the blowing member, based on wind velocity data including a fluctuation pattern of wind velocity of wind blowing in an outdoor natural environment obtained in advance or in real time, such that a fluctuation pattern of a flow rate of the air blown out from the blow-out region is the fluctuation pattern of the wind velocity included in the wind velocity data.

2. The air-blowing apparatus of claim 1, wherein air is blown out from the blow-out region such that the ratio (Vmax/Vmin) of the maximum value Vmax of wind velocity to the minimum value Vmin of the wind velocity is 1 or more and 5 or less in the target virtual plane.

3. The air-blowing apparatus of claim 1, wherein air is blown out from the blow-out region such that the ratio (Vmax/Vmin) of the maximum value Vmax of wind velocity to the minimum value Vmin of the wind velocity is 1 or more and 2.5 or less in the target virtual plane.

4. The air-blowing apparatus of claim 1, wherein in a case in which a rectangular virtual plane that faces the blow-out region, is positioned at a distance of 2 m from the blow-out region, and has a long side extending in the vertical direction and having a length of 120 cm and a short side extending in the right-to-left direction and having a length of 67.5 cm is set as a middle virtual plane, the target virtual plane is located in a portion of the target virtual space between the front virtual plane and the middle virtual plane.

5. The air-blowing apparatus of claim 1, wherein the target virtual plane is the rear virtual plane.

6. The air-blowing apparatus of claim 1, wherein the blowing member is a plurality of fans arranged so as to face the blow-out region.

7. The air-blowing apparatus of claim 1, wherein the main body includes a rectifying member configured to allow air to pass therethrough and provided on the entire blow-out region, and the blowing member is a fan arranged upstream of the rectifying member.

8. An air conditioner comprising:
the air-blowing apparatus of claim 1; and
a heat exchanger which allows heat exchange of supply air to be sucked into the air-blowing apparatus with a thermal medium to adjust a temperature of the supply air.

* * * * *